United States Patent
Ishizaka

[11] Patent Number: 6,120,154
[45] Date of Patent: Sep. 19, 2000

[54] REFLECTOR FOR VEHICLE

[75] Inventor: Hiroyuki Ishizaka, Tokyo, Japan

[73] Assignee: Hino Jidosha Kogyo Kabushiki Kaisha, Tokyo, Japan

[21] Appl. No.: 09/262,075

[22] Filed: Mar. 4, 1999

[30]   Foreign Application Priority Data

Mar. 4, 1998  [JP]  Japan .................................. 10-052208

[51] Int. Cl.⁷ ...................................................... G02B 5/08
[52] U.S. Cl. ........................... 359/850; 359/851; 359/862; 359/834; 359/837; 359/584; 359/589; 250/330
[58] Field of Search ..................................... 359/850, 851, 359/862, 864, 865, 833, 834, 837, 584, 589; 250/330; 296/97.1, 97.2

[56]   References Cited

U.S. PATENT DOCUMENTS 4,210,357  7/1980  Adachi .................................. 296/84 B

FOREIGN PATENT DOCUMENTS

10-79616  3/1998  Japan .

*Primary Examiner*—Cassandra Spyrou
*Assistant Examiner*—Mohammad Y. Sikder
*Attorney, Agent, or Firm*—Pillsbury Madison & Sutro, LLP

[57]   ABSTRACT

An electromagnetic reflector which is effective for electromagnetic waves in a range from 50 to 100 GHz, radiated from an on-board radar device, is integrally incorporated with an optical reflector for effectively receiving the electromagnetic waves by the reflector and, as reflected thereby, by the radar device even though the relative angle for receiving reflected radar waves becomes larger due to a shift of lanes by the preceding vehicle or due to a curve in the road.

6 Claims, 9 Drawing Sheets

Direction in which Electromagnetic Waves are Incident

Direction in which Electromagnetic Waves are Incident

REFLECTOR FOR VEHICLE

CROSS REFERENCE TO RELATED APPLICATIONS

The present invention claims priority from Japanese Patent Application No. 10-52208 filed Mar. 4, 1998, the contents of which are incorporated herein by reference.

BACKGROUND OF THE INVENTION

1. Field of the Invention

The present invention relates to a radio wave reflector adapted to be used for an automobile, and having a high reflection factor with respect to radio waves radiated from an on-board radar device or radio wave detectors arranged along a road.

2. Description of Related Art

It has been ruled that frequencies for on-board radar devices are available in a range of 50 to 100 GHz. Specific frequencies therefor differ among countries having different national characteristics. For example, the frequency is proposed to be 60 GHz in Japan but is 76 GHz in Europe and U. S. A. Testing for on-board radar devices using the above-mentioned frequency bands has been started.

Meanwhile, it has been obliged for safety standards that optical reflectors be incorporated in a vehicle (Safety Regulations for Road Transport Vehicles Act. 38 (rear reflectors) and Act. 35-2 (side lamps and side reflectors)) in order to confirm reflected light from each of the reflectors when it is irradiated by a light beam emitted from a running front lamp during nighttime, rearward or laterally from the reflector by a distance of 150 m. Specifically, it is ruled that the reflecting part of the reflector must have an area larger than 10 cm$^2$ and a shape other than a triangular shape. These reflectors are attached to the rear end and the sides of a vehicle in order to satisfy the safety regulations.

The inventors have carried out tests for electromagnetic reflection characteristics of on-board radar devices and have found that conventional optical reflectors do not have satisfactory reflection characteristics in the available frequency range of 50 to 100 GHz. The reflection of electromagnetic waves on a vehicle can be obtained from a metal part of the vehicle, and such metal parts are almost planar so that intense reflection waves can be obtained only in the same direction as the incident direction of the electromagnetic waves. It has been found that this causes reflection waves from the radar to decrease at a time when the radar device has to exhibit its highest function, that is, at the time when a preceding vehicle captured and recognized by a radar device shifts from one into another lane or the like.

Further, it has been found that the intensity of reflection waves is not satisfactory as to small sized vehicles or motorcycles. This mainly causes the power of output electromagnetic waves from on-board radar devices to be inevitably increased, and accordingly, inconvenience such as interference of electromagnetic waves would occur among on-board vehicles.

SUMMARY OF THE INVENTION

The present invention is devised in view of the above-mentioned background, and accordingly, one object of the present invention is to provide an apparatus for mounting on a vehicle an electromagnetic wave reflector which is effective for electromagnetic waves radiated from an on-board vehicle. Further, another object of the present invention is to provide an electromagnetic wave reflector which can be mounted on a vehicle, being integrally incorporated with an optical reflector whose mounting has been conventionally obligatory, in order to avoid significantly increasing the cost and the man-hours of work incurred.

According to the present invention, there is provided a distinctive structure by which reflected electromagnetic waves can be effectively received even though the relative angle of the reflection of electromagnetic waves radiated from an on-board radar device varies due, for example, to a preceding vehicle shifting into another lane.

That is, the present invention is characterized in that an optical reflector and an electromagnetic wave reflector which is effective for electromagnetic waves in a range from 50 to 100 GHz are formed in a one unit body.

The above-mentioned reflector includes a pyramid-like part having pyramidal surfaces, which are arranged to be concave in a direction in which electromagnetic waves are incident, and having a triangular pyramid-like shape each ridge or edge of which is 10 to 200 mm. The reflector has an electromagnetic wave reflecting surface made of metal and preferably incorporates a protecting means made of a resin material having a high electromagnetic wave transmission factor in a direction in which electromagnetic waves are incident.

A vehicle radar device transmits electromagnetic waves in front of a vehicle in a vehicle advancing direction and over angles around that direction, and receives reflected electromagnetic waves from an obstruction including a preceding vehicle so as to measure data relating to a distance to the obstruction based on the elapsed time between the transmission and the receiving of electromagnetic waves. For example, the distance to the preceding vehicle is steadily measured, and when the distance decreases to a certain smaller value, depending on speed, an alarm is automatically issued so as to allow the driver to pay more attention.

An electromagnetic reflector which is effective for electromagnetic waves in the 50 to 100 GHz frequency range is incorporated into a single unit together with an optical reflector and is mounted on the rear or one side of a vehicle. Electromagnetic waves transmitted from a transmission antenna of the vehicle radar device of a trailing vehicle is reflected by the electromagnetic reflector of the preceding vehicle, and the thus reflected waves from a broad zone are received by a receiving antenna of the radar device.

Electromagnetic waves are radiated from the transmission antenna over a predetermined angle in front of the vehicle. The electromagnetic reflector according to the present invention is formed in a pyramidal shape and is arranged so that their pyramidal surfaces form a concavity in a direction in which the electromagnetic waves are incident. Thus, even though the preceding vehicle changes its direction of travel due to a curved road or a shift from one lane into another, the radiated electromagnetic waves can be reflected by any part of the pyramidal surfaces of the electromagnetic reflector due to its concave shape, and accordingly, reflected electromagnetic waves can be effectively received.

As to the pyramidal shape, a triangular pyramidal shape is desirable in order to increase the reflection characteristic value. The length of the edges of the triangular pyramid shape is selected in a range from 10 to 200 mm, and the reflection characteristic value can be optionally changed by changing the length of those edges.

The electromagnetic wave reflecting surface of the reflector is made of metal. That is, either a metal sheet may be used as the electromagnetic wave reflecting surface, or a metallic paint coating may be used as the electromagnetic wave reflection surface. Thus, the efficiency of reflection of electromagnetic waves can be enhanced, and a tough mechanical strength can be obtained.

As to the protecting means incorporated in the electromagnetic wave reflector in a direction in which electromagnetic waves are incident, a cover made of resin materials such as acrylic resin, ABS, Teflon or polycarbonate is mounted to the reflector so as to protect the reflecting surfaces of the electromagnetic wave reflector with no hindrance to the transmission of electromagnetic waves and the designability thereof. This cover will be better understood upon considering the content of Japanese Patent Laid-open No. H10-79616 the contents of which are incorporated hereinto by reference. With this arrangement, electromagnetic waves radiated from an on-board radar device of a following vehicle can be effectively reflected from the preceding vehicle, and reflected waves can be surely received by the following vehicle, irrespective of variation in the running condition of the preceding vehicle. It is thereby possible to measure a vehicle-to-vehicle distance precisely. Further, the electromagnetic wave reflector can be integrally incorporated with an optical reflector which has been conventionally mounted to a vehicle, and accordingly, it is possible to materialize the electromagnetic wave reflector without the cost and working manhours from being excessively increased.

BRIEF DESCRIPTION OF THE DRAWINGS

The present invention will become more apparent by reference to the following description of the invention taken in conjunction with the accompanying drawings, in which.

DETAILED DESCRIPTION OF THE PREFERRED EMBODIMENTS

Figure 1:
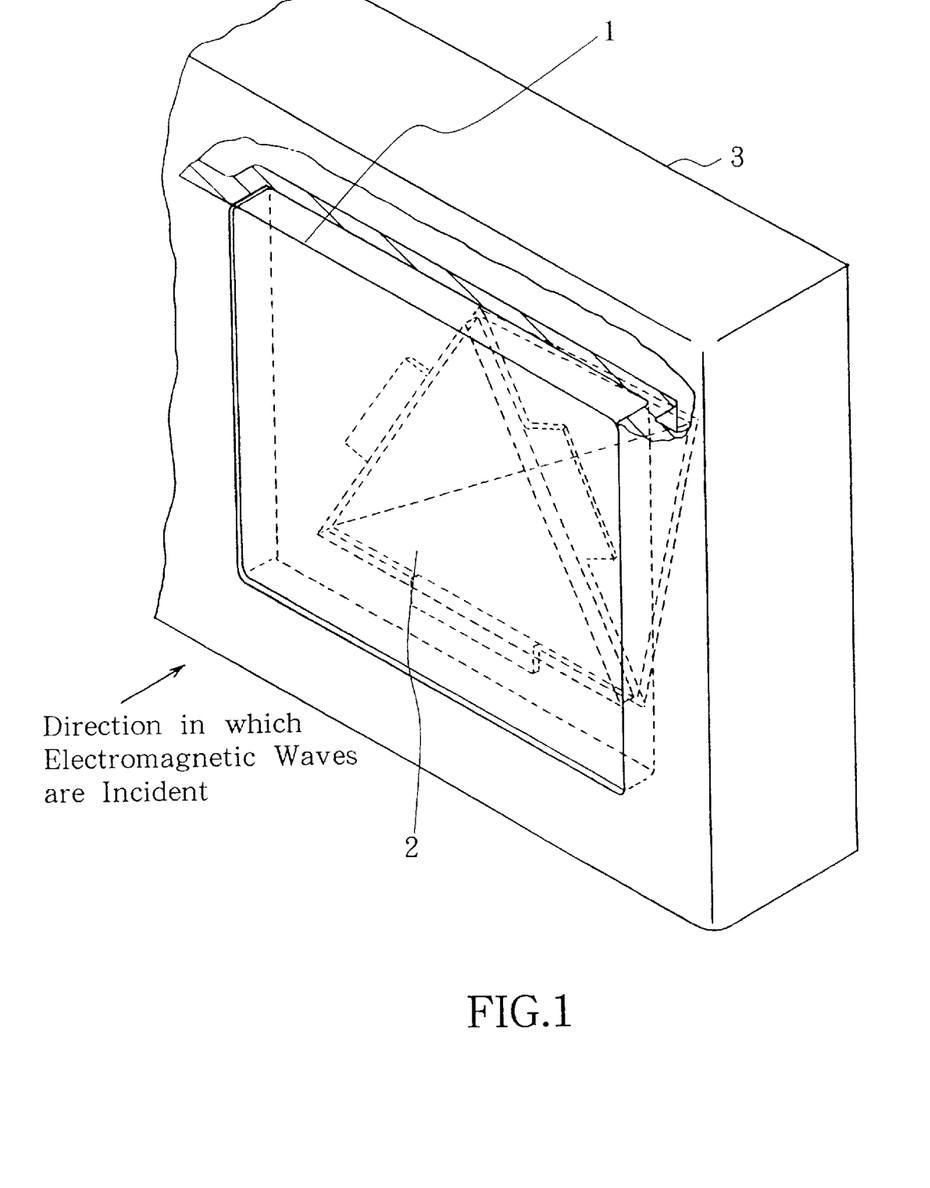
FIG. 1 is a perspective view illustrating a first embodiment of the present invention, as viewed from behind a vehicle.

First, in reference to FIGS. 1 and 2 which are a perspective view and an exploded perspective view illustrating a reflector device in a first embodiment, as viewed from behind a vehicle, explanation will be made of the first embodiment of the present invention in which an optical reflector 1 and in line therewith an electromagnetic reflector 2 which is effective for electromagnetic waves in a range from 50 to 100 GHz are incorporated as a unit in frame 3.

The electromagnetic wave reflector 2 is of the type referenced in *Radar Cross Section Handbook*, Ruck et al., Vol. 2, page 591, Plenum Press, New York-London, 1970, and has hollow a pyramidal shape having triangular surfaces. The bottom or base of the pyramid faces the inner side of the optical reflector 1, in a parallel relationship with the optical reflector 1 or at an angle thereto as shown, and the bottom is open so that the inner sides of the pyramid are arranged in a concave shape which forms a cavity in a direction in which electromagnetic waves are incident. In this embodiment, a triangular pyramidal shape is used as the pyramidal shape of the part of the electromagnetic reflector, each ridge or edge of which has a length of from 10 to 200 mm from the common intersection of the triangular sides. That is, the cross-section of reflector 2 is triangular, and the reflector technically has a triangular hollow trihedral shape. As shown in the above handbook, a triangular trihedral corner reflector has wide angular coverage.

The electromagnetic wave reflector 2 is molded from a resin material, and the inside surfaces thereof are subjected to surface treatment with metal.

Figure 2:
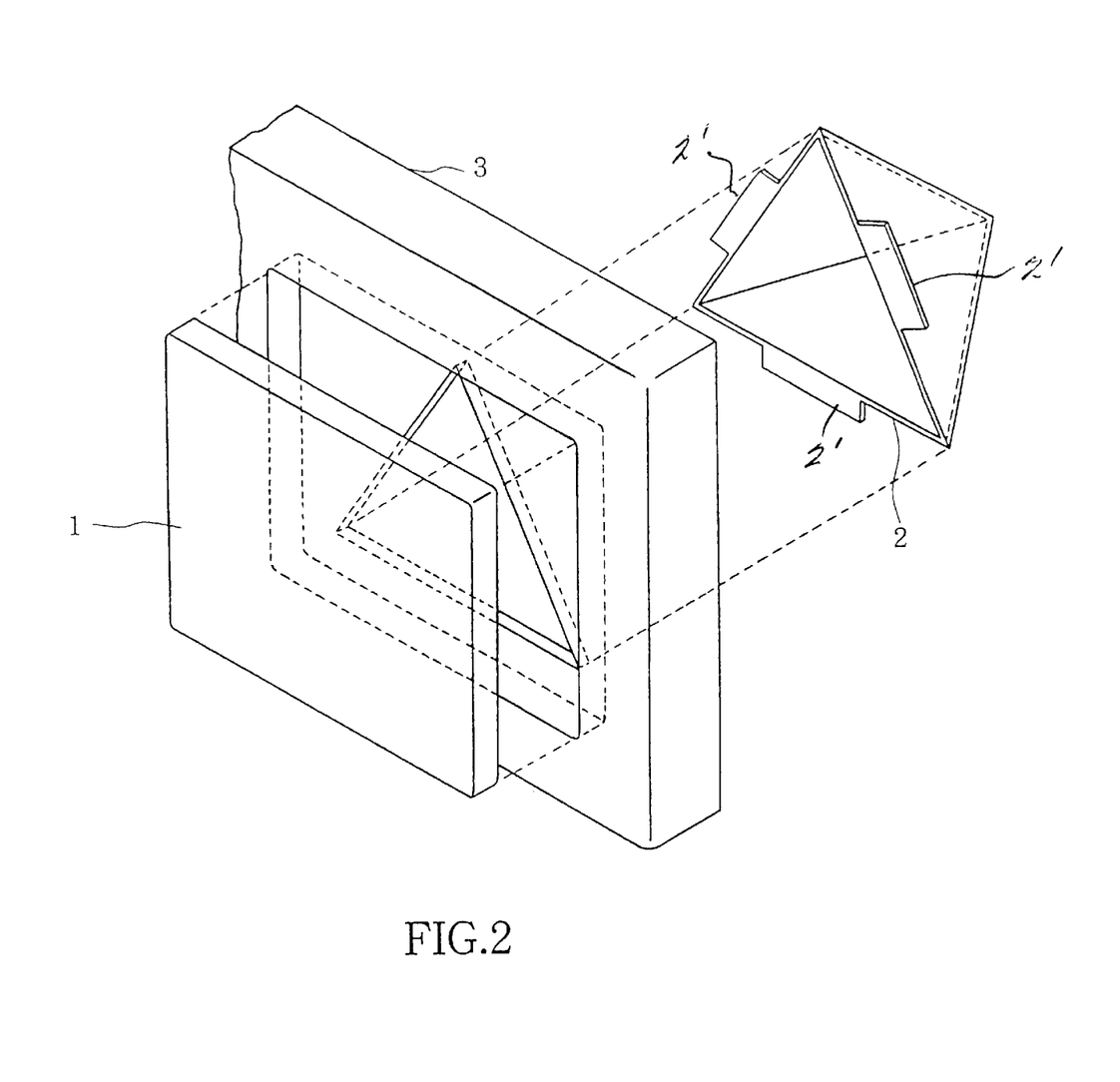
FIG. 2 is an exploded perspective view illustrating the arrangement shown in FIG. 1 as viewed from behind the vehicle.

The three tabs 2' shown in FIG. 2 as projecting outwardly from the edges of the bottom of the electromagnetic wave reflector 2 may be used as stops for assembly purposes.

Figure 3:
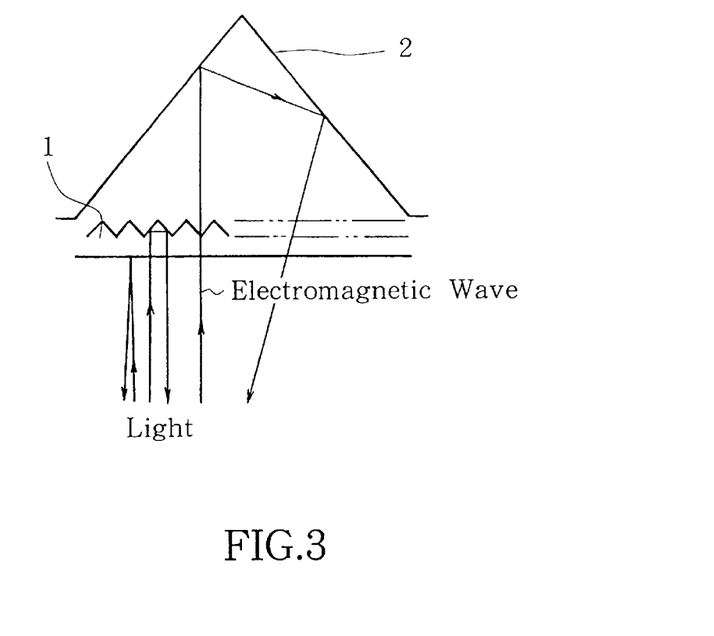
FIG. 3 is a graph for explaining a reflecting condition of light and electromagnetic waves of an optical wave reflector and an electromagnetic reflector in the first embodiment of the present invention.

FIG. 3 is a view for explaining the condition of reflection of light and electromagnetic waves by the optical reflector 1 and the electromagnetic wave reflector 2 in the first embodiment. FIG. 3 shows that when light and electromagnetic waves are irradiated to the surface of the optical reflector 1 in a direction perpendicular to the lens surface of the optical reflector, the light irradiated to the optical reflector 1 is directly reflected by the surface thereof, and the incident light is refracted by a prism formed at the rear surface thereof and is radiated therefrom as reflected light. Meanwhile, electromagnetic waves received from a radar device (not shown) transmit once through the optical reflector 1 and are repeatedly reflected by the electromagnetic reflector 2, and then, the electromagnetic waves are finally reflected toward the radiation side after they transmit again through the optical reflector 1 toward the source of the electromagnetic waves.

In FIG. 3, the illustrated sides of the electromagnetic wave reflector 2 have a length L which is in the range 10 mm to 200 mm.

Figure 4:
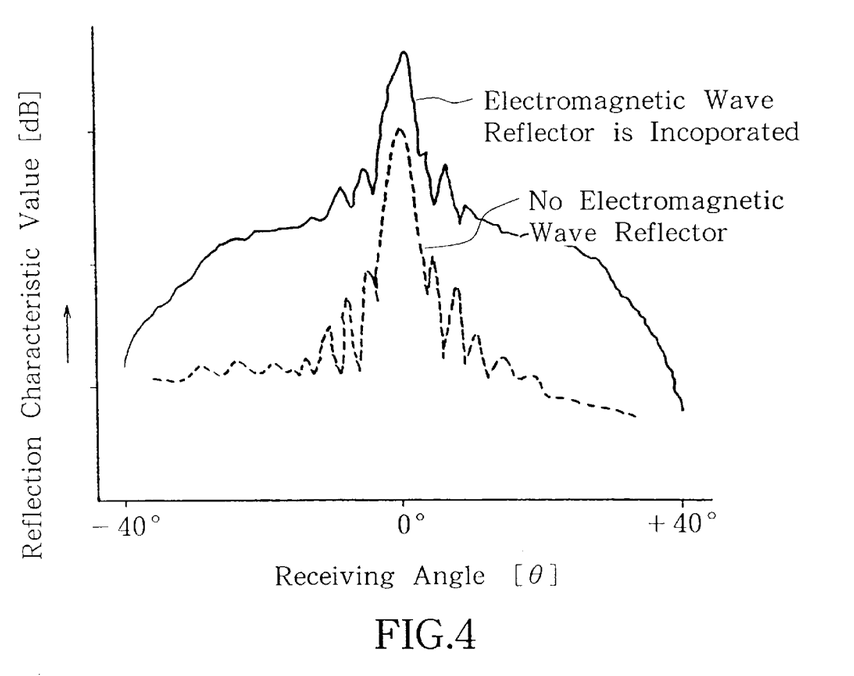
FIG. 4 is a graph illustrating an example of reflection characteristic values obtained by measurements with the use of a triangular pyramidal shaped electromagnetic wave reflector in the first embodiment of the present invention.
Figure 5:
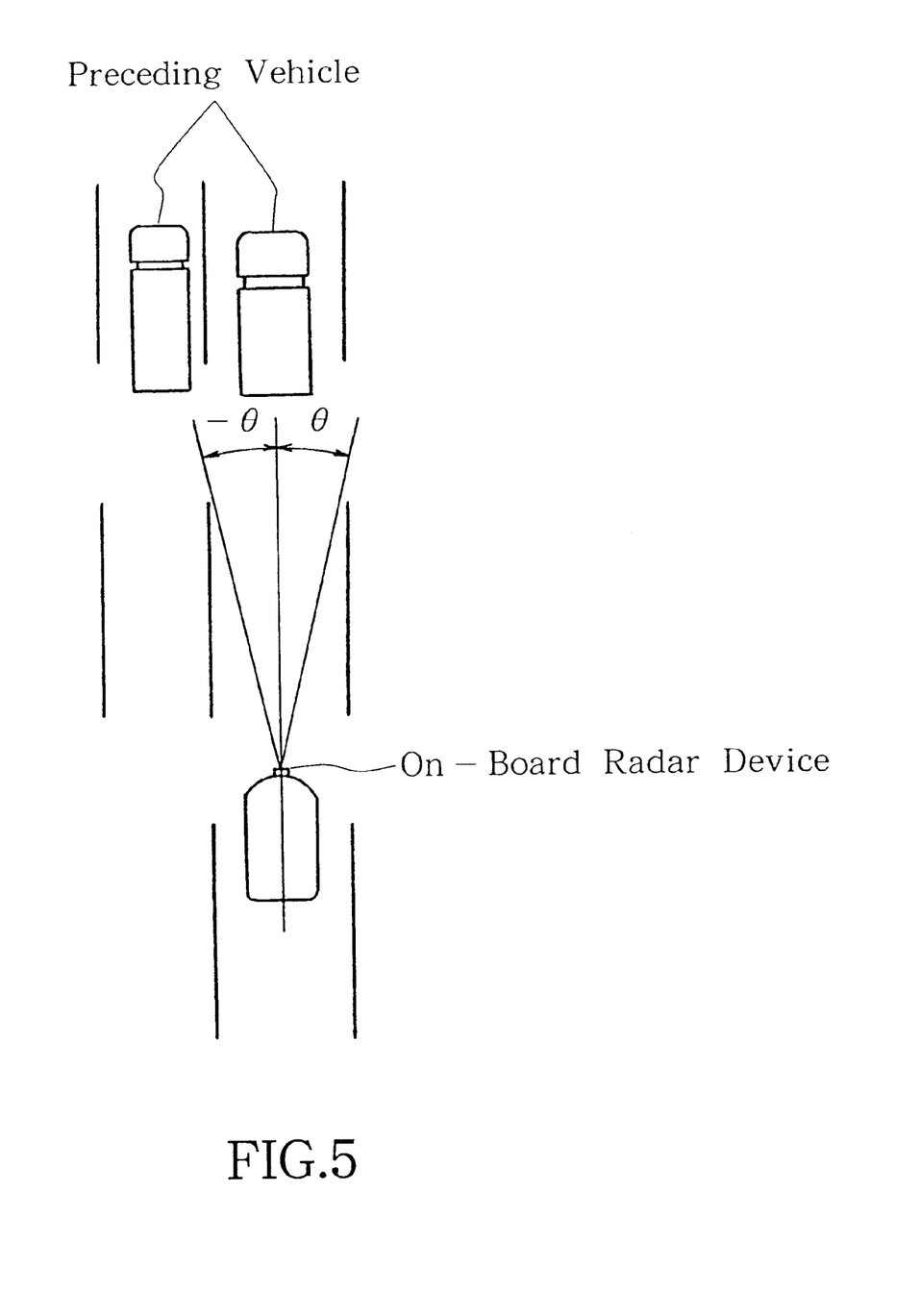
FIG. 5 is a diagram for explaining a receiving angle shown in FIG. 4 in the first embodiment of the present invention.

FIG. 4 is a graph showing an example of actual measured reflection characteristic values which were measured with the use of a triangular pyramidal shaped reflector in the first embodiment of the present invention. In this figure, the broken line indicates a reflection characteristic curve which was obtained by radiating electromagnetic waves to a vehicle which does not incorporate the electromagnetic wave reflector 2. The reflection characteristic values RCS (Radar Cross Section) (dB) are taken along the ordinate, and receiving angles ($\theta$) of electromagnetic waves are taken along the abscissa It is noted that, as shown in FIG. 5, the receiving angles on the left side are considered negative ($-\theta$), and those on the right side are considered positive ($+\theta$).

As understood from FIG. 4, reflected waves from a vehicle which incorporates the electromagnetic wave reflector 2 of this invention are reflected by larger values over a wide range in comparison with reflected waves from a vehicle which does not incorporate the electromagnetic wave reflector 2.

It is noted that the reflection characteristic values (RCS) of a triangular pyramidal shaped reflector using a right-angled isosceles triangle can be obtained from the following formula:

$$RSC = (4\pi L^4)/3\lambda$$

where L is the length of the three isosceles edges which meet at a common point (the apex) and $\lambda$ is a wavelength. It has been known that, the reflection characteristic value varies as listed in the following table if the isosceles edge length is changed:

TABLE

| L (mm) | RCS (dB) |
|--------|----------|
| 66     | 5        |
| 88     | 10       |
| 156    | 20       |

Accordingly, an electromagnetic wave reflector for any of various kinds of vehicles can be designed by changing the length of the isosceles sides of the triangular pyramidal shape.

Figure 6A:
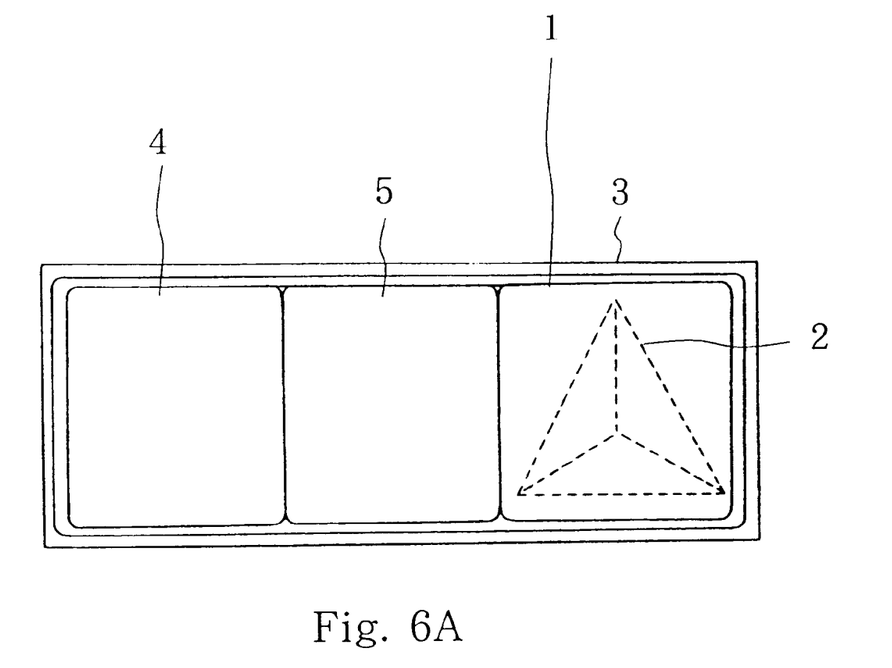
FIGS. 6A and 6B are views illustrating examples of arrangements of the optical reflector and the electromagnetic wave reflectors in the first embodiment of the present invention.
Figure 6B:
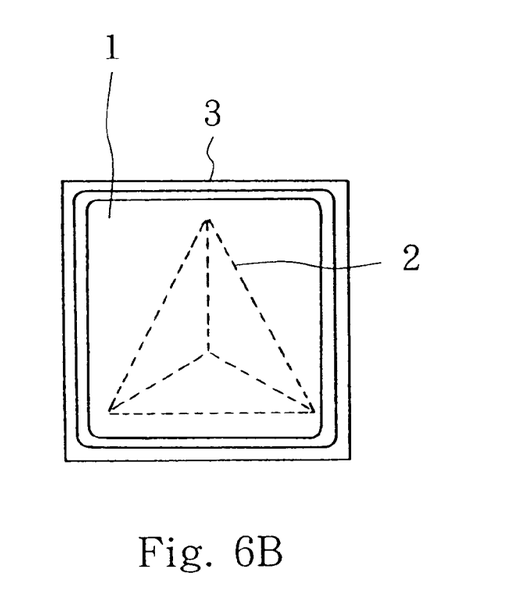

FIGS. 6A and 6B show examples of the reflector device including the optical reflector and electromagnetic reflector of the first embodiment of the present invention. That is, FIG. 6A shows the left side one of a pair of arrangements which are respectively disposed on the left and right sides of the rear part of a vehicle. In this example of the reflector device, the optical reflector 1 and the electromagnetic wave reflector 2 are integrally incorporated with each other together with a tail lamp 4 and a turn indicator 5 in a frame 3. Further, FIG. 6B shows an example of the reflector device in which the optical reflector 1 and the electromagnetic wave reflector 2 are incorporated in a single unit.

Figure 7A:
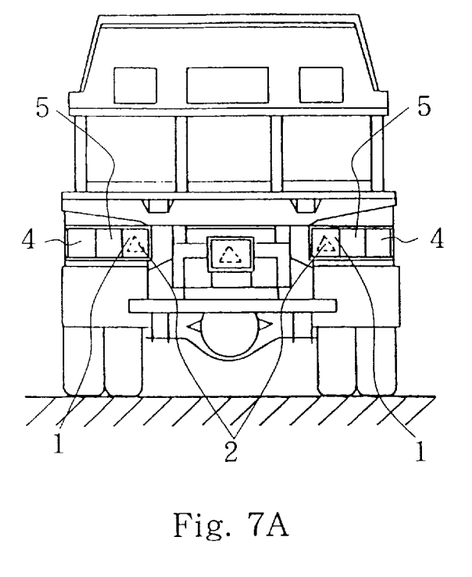
FIGS. 7A, 7B, 7C and 7D are views illustrating examples of installation of the arrangement, in the first embodiment of the present invention, on different kinds of vehicles.

FIGS. 7A to 7D show examples of the mounting thereof on the rear end of different kinds of vehicles. FIG. 7A shows the mounting on a large-sized truck. On the left side is the arrangement shown in FIG. 6A in which the optical reflector 1 and the electromagnetic wave reflector 2 of the reflector device are located in one and the same frame together with the tail lamp 4 and the turn indicator 5. Symmetrically, on the right side is a mirror image of the arrangement in FIG. 6A. Further, the arrangement shown in FIG. 6B in which the optical reflector 1 and the electromagnetic wave reflector 2 of the reflector device are incorporated in a single unit is located in the center part of the vehicle.

Figure 7B:
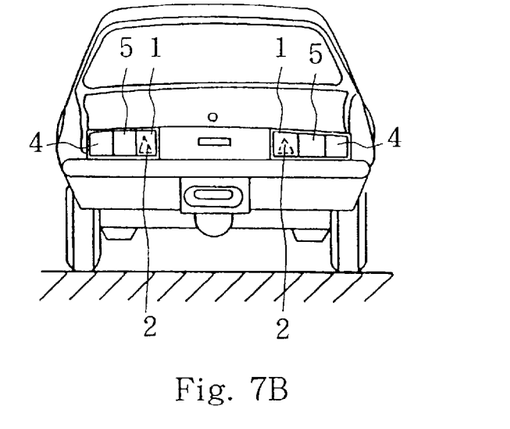
Figure 7C:
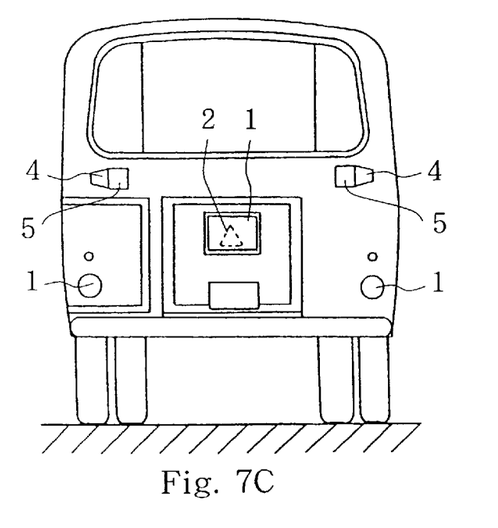
Figure 7D:
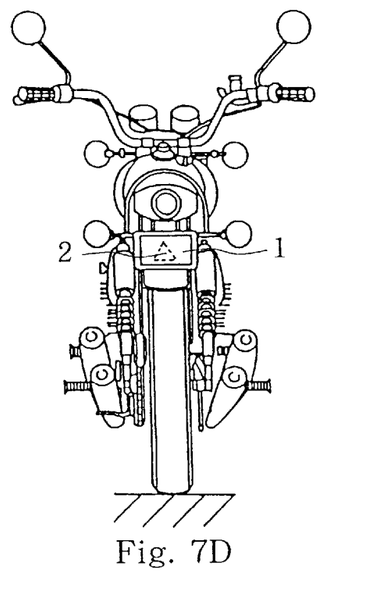

FIG. 7B shows the mounting on the rear end of a passenger vehicle of a FIG. 6A arrangement on the left side and a mirror image of FIG. 6A on the right side. FIG. 7C shows the mounting at the center of the rear end of a middle size bus of the arrangement shown in FIG. 6B. FIG. 7D shows the FIG. 6B arrangement mounted on the rear end of a motorcycle.

One or a plurality of the reflector devices according to the present invention may be arranged in accordance with the kind of vehicle. For example, reflector devices may be arranged on opposite sides of a vehicle. In this case, electromagnetic waves received from a radar device and reflected by the reflector devices can be received multidirectionally, and accordingly, the receiving zone can be enlarged. This arrangement is effective for a radar device which monitors a side of a vehicle or for a traffic survey in which radar devices are arranged along a road.

Figure 8:
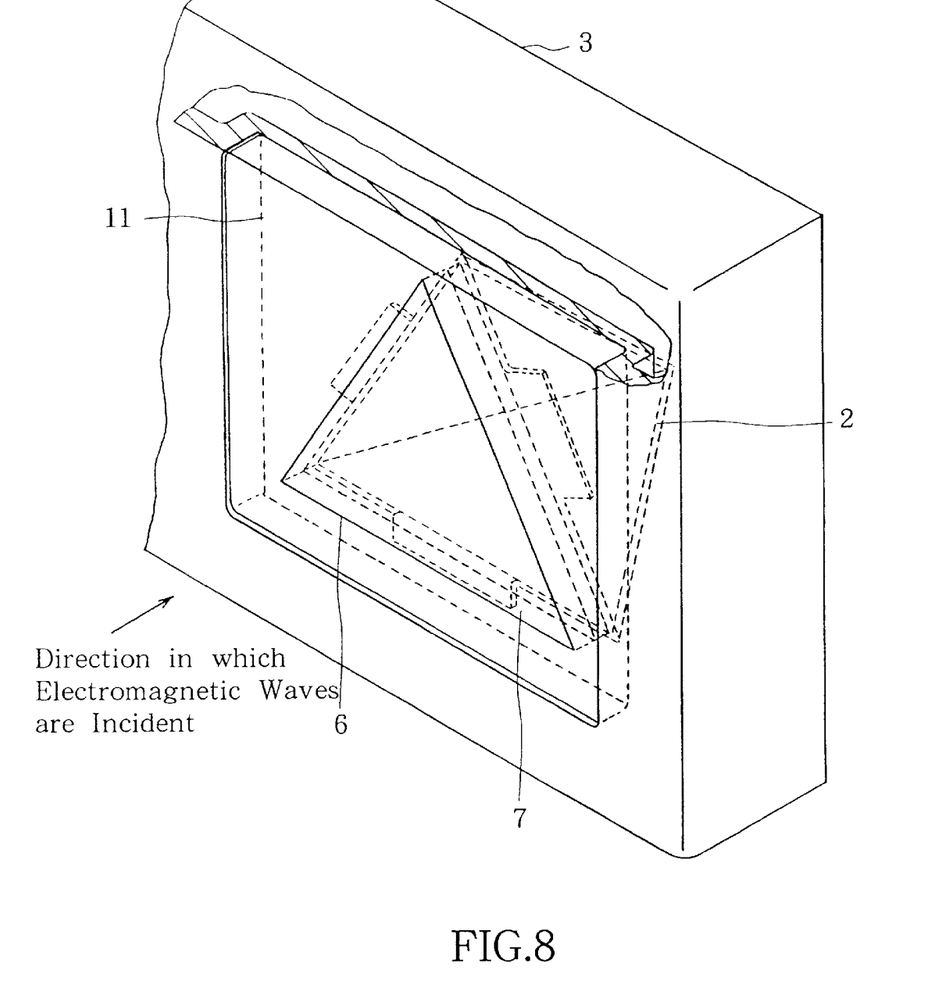
FIG. 8 is a perspective view illustrating a second embodiment of the present invention, as viewed from behind a vehicle.
Figure 9:
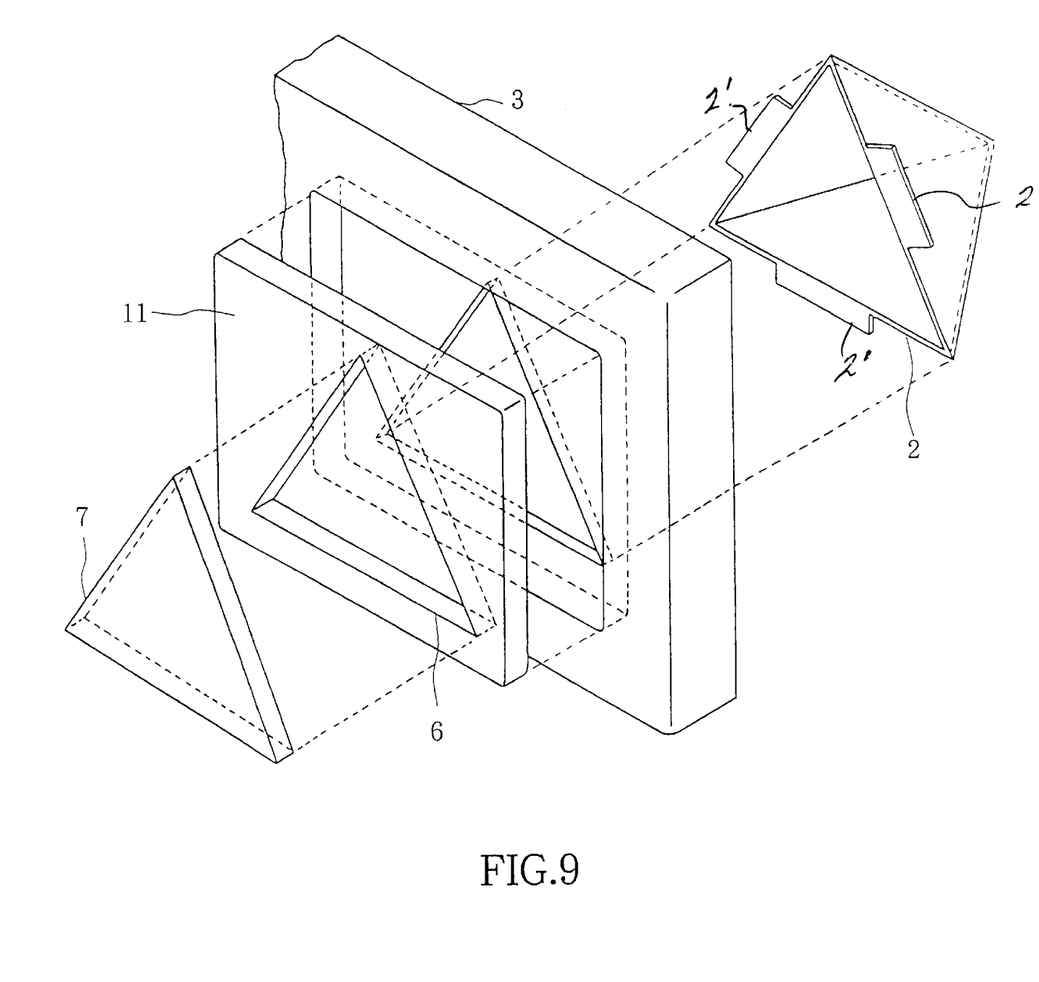
FIG. 9 is an exploded perspective view illustrating the arrangement shown in FIG. 8.

Reference is now made to a second embodiment as shown in FIGS. 8 and 9.

FIG. 8 is a perspective view illustrating a reflector device in a second embodiment of the present invention, as viewed from behind a vehicle, and FIG. 9 is an exploded perspective view of the FIG. 8 arrangement. An optical reflector 11 and a triangular pyramidal shaped electromagnetic reflector 2 which is effective for electromagnetic waves in a range of 50 to 100 GHz are incorporated in a single unit as in the first embodiment. The optical reflector 11, however, is formed with a triangular cut-out opening 6 having a shape corresponding to the shape of an opening surface of the electromagnetic wave reflector 2, upon which electromagnetic waves are incident. A protecting cover 7 serving as a protecting means is fitted in the cut-out opening 6. This protecting cover 7 is made of a resin material having a high transmission factor with respect to electromagnetic waves, such as acrylic resin, polycarbonate resin, ABS (acrylonitrile butadiene styrene) resin and Teflon resin.

Figure 10:
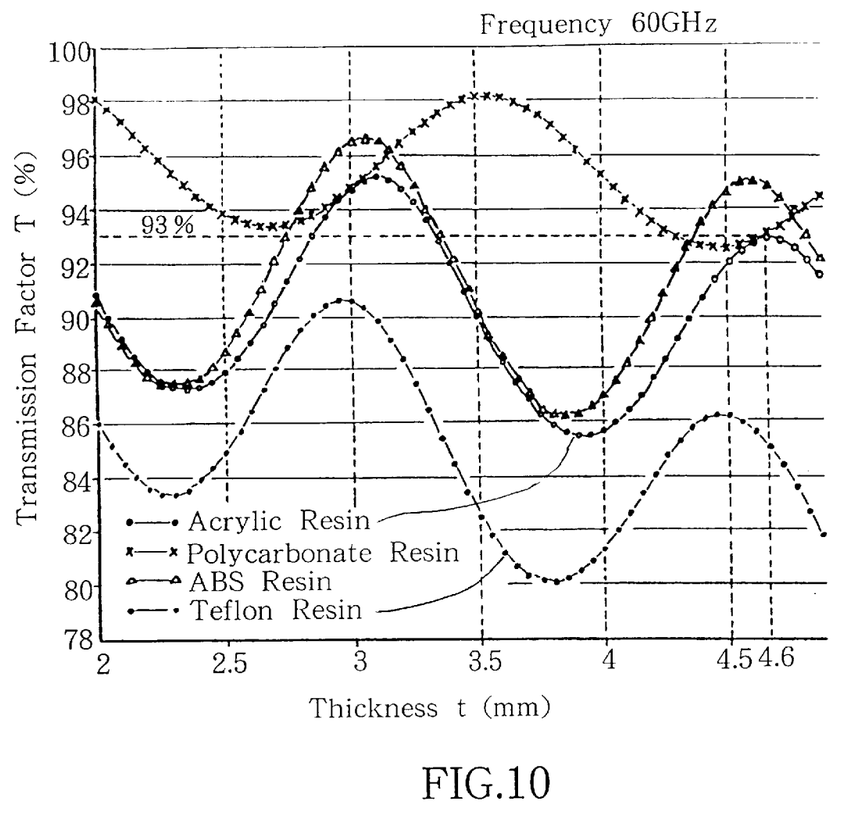
FIG. 10 is a graph showing the relationship between a thickness of a dielectric material and a transmission factor of electromagnetic waves at a frequency of 60 GHz.

FIG. 10 shows the relationship between the thickness t and the transmission factor T with respect to electromagnetic waves at a frequency of 60 GHz for four dielectric materials: acrylic resin, polycarbonate resin, ABS resin and Teflon resin. FIG. 10 was originally shown in Japanese Patent Application Laid-Open No. H10-79616, the contents of which are incorporated by reference. The relationship between the thickness t of the dielectric material and the transmission factor T is such that the transmission factor does not proportionally decrease as the thickness t increases. However, for example, in the case of the acrylic resin, the transmission factor T is 87% when the thickness t is 2.3 mm, but the transmission factor T is 95% when the thickness t is 3.1 mm. Further, it decreases to 85.5% when the thickness t is 3.9 mm while it increases to 93% when the thickness t is 4.6 mm.

With the use of the characteristic, it is possible to select a thickness t which can satisfy the mechanical strength and also exhibit a high transmission factor T. For example, in the case of using the acrylic resin, when the thickness is set to t=4.6 mm, a high transmission factor of 93% can still be obtained.

In the case of the second embodiment, since the surface upon which electromagnetic waves are incident is made of a resin material having a high transmission rate for electromagnetic waves, the reflectivity can be further enhanced in such a condition that the reflecting surface is sufficiently protected.

As stated above, according to the present invention, electromagnetic waves radiated from an on-board radar device can be effectively reflected in a broad zone, the vehicle-to-vehicle distance can be precisely measured even though the preceding vehicle runs on a curved road or shifts from one to another zone, thereby ensuring a safe distance. Further, since an electromagnetic reflector can be integrally incorporated with a conventionally incorporated optical reflector, it is possible to materialize the on-board electromagnetic wave reflector without incurring a significant increase in the cost and the man-hours of work.

While the foregoing description has detailed the invention, the invention is not to be limited by such details but only by the scope of the appended claims.

What is claimed is:

1. A reflector device for a vehicle comprising:
   a single-unit incorporating an optical reflector and in line therewith an electromagnetic wave reflector which is effective for reflecting electromagnetic waves in a range from 50 to 100 GHz, wherein said electromagnetic wave reflector includes a pyramidal shaped hollow part having an open bottom and having internal triangular reflecting surfaces which together form a cavity extending to a point in a direction in which the electromagnetic waves are incident via said open bottom.

2. A reflector device as set forth in claim 1, wherein said pyramidal shaped hollow part has a triangular trihedral shape.

3. A reflector device as set forth in claim 2, wherein said triangular trihedral shape has edges extending from said point for a length of 10 to 200 mm.

4. A reflector device as set forth in claim 1, wherein said electromagnetic wave reflector has internal electromagnetic wave reflecting surfaces that are metallic.

5. A reflector device as set forth in claim 1, including protecting means made of a resin material having, a high electromagnetic wave transmission factor provided in a direction in which the electromagnetic waves are incident upon the electromagnetic wave reflector for protecting said pyramidal reflecting surfaces.

6. A reflector device as in claim 1 wherein said optical reflector has an aperture corresponding to and adjacent said open bottom of said pyramidal shaped part, said aperture being filled with a resin material which has a high transmission factor with respect to said electromagnetic waves.

\* \* \* \* \*